United States Patent

Henry

[11] Patent Number: 5,213,299
[45] Date of Patent: May 25, 1993

[54] GRILL PROP

[76] Inventor: Robert E. Henry, 1729 Greer Dr. W., Newark, Ohio 43055

[21] Appl. No.: 723,563

[22] Filed: Jul. 1, 1991

[51] Int. Cl.⁵ .............................................. E05C 17/00
[52] U.S. Cl. .................................. 248/354.4; 248/351; 248/214; 126/25 R
[58] Field of Search ..................... 248/215, 214, 295.1, 248/351, 354.4, 354.1; 126/25 R, 41

[56] References Cited

U.S. PATENT DOCUMENTS

| | | | |
|---|---|---|---|
| 2,631,809 | 3/1953 | Jacobson | 248/228 X |
| 3,048,460 | 8/1962 | Herbst et al. | 248/354.4 X |
| 3,531,073 | 9/1970 | Cortina | 248/300 X |
| 4,124,240 | 11/1978 | Adelberg | 248/351 X |
| 4,584,984 | 4/1986 | Croft | 126/25 R |
| 4,913,391 | 4/1990 | Klepp | 248/214 |

Primary Examiner—Alvin C. Chin-Shue
Attorney, Agent, or Firm—John P. Halvonik

[57] ABSTRACT

The invention relates to an apparatus for propping open grill lids which is adjustable to allow for various elevations of the lid of the grill. Use of the apparatus retains heat within the grill, saves fuel by limiting the oxygen supply to the grill; requires no additional tools; is easy to remove, and is self storing. The invention also reduces cooking time.

2 Claims, 1 Drawing Sheet

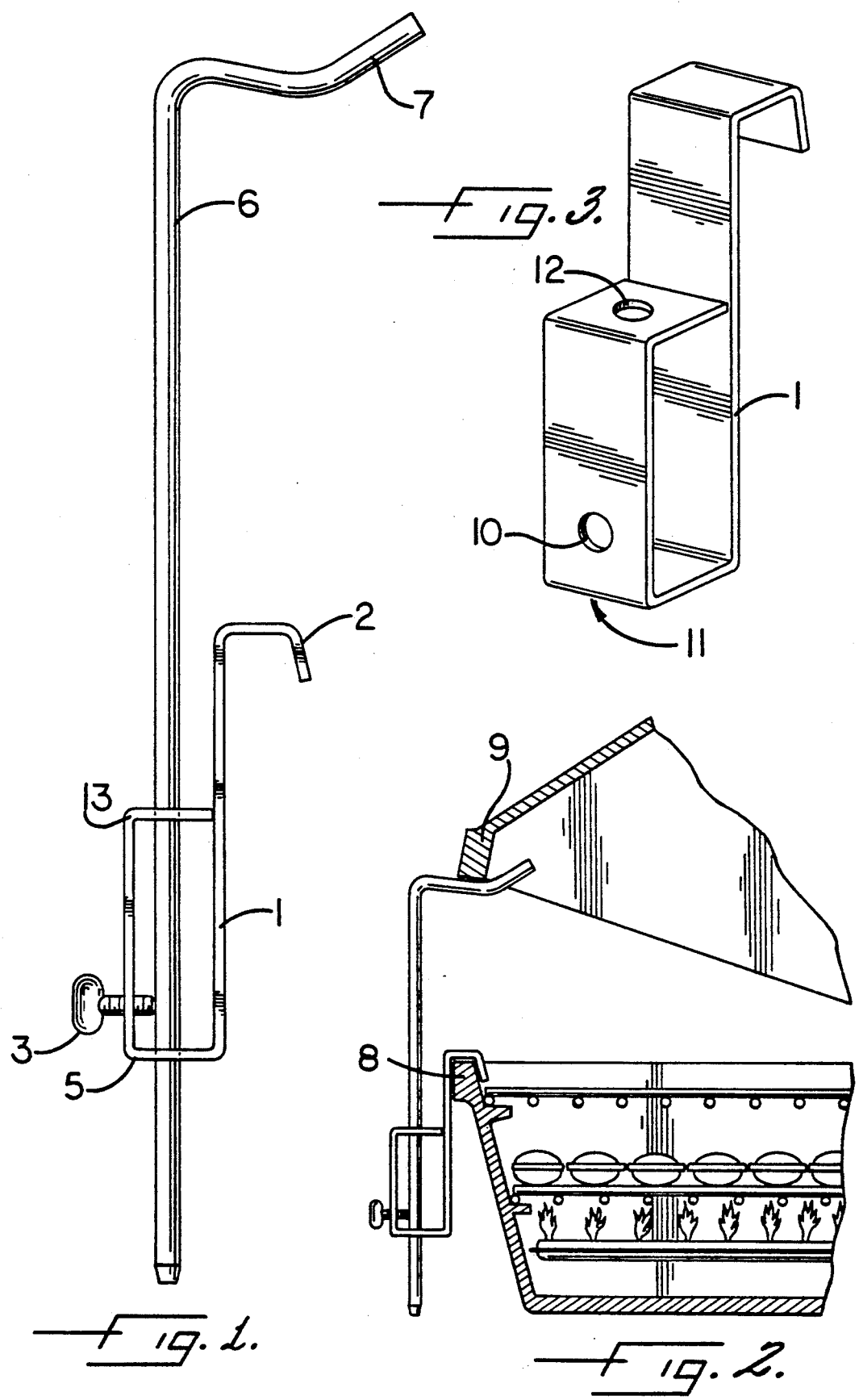

GRILL PROP

BACKGROUND OF THE INVENTION

1. Field of the Invention

The invention relates to the field of grilling and, in particular, to an adjustable propping device which can be set at various levels to vary the amount the lid of the grill is open.

2. Prior Art

There are no devices that the applicant is aware of for propping open grill lids that are of the same construction as his.

SUMMARY OF THE INVENTION

The invention relates to an adjustable apparatus for propping open a grill lid.

It is an objective of the invention to provide a propping means for grills that do not ordinarily come with such means.

It is the object of this invention to reduce cooking time. used in a grill that does not ordinarily have its own means to prop open the lid.

It is another object of the invention to save fuel and energy consumed by a grill.

Yet another objective is to provide a propping means for grill lids to be adaptable to accommodate most grills.

DRAWINGS

FIG. 1 shows overall construction of the apparatus.
FIG. 2 shows the device in use.
FIG. 3 shows details of the lower piece

DESCRIPTION OF THE PREFERRED EMBODIMENT

The apparatus is substantially as shown in FIG. 1. There are two major pieces in the basic construction. The lower, or, support piece 1 acts as a support for the upper piece 6 which is the actual piece which serves as the prop for the lid 9 of the grill.

The support piece 1 may be of metal construction and preferably of a long narrow shape. The support piece is in a sort of "S" shape with an upper portion 2 that is curved back upon itself so that it may be rested upon the rim 8 of the lower halve of the grill. This lower halve of the grill is shown as the grill base in FIG. 2. The typical commercial grill has a rim or lip of ⅜ inches. Commercial grills such as Char-Broil, Webber, Strutco, Themos, Areland, Sunbeam, Ducolor, Charm Glo, Nantucket would have these dimensions. The size of the curve of the upper portion 2 is chosen so as to fit the rim of these commercial grills.

The lower portion 5 of the support piece is also curved back so that a portion of the lower portion is parallel to the middle portion of the lower piece and the very end is curved back near the middle of the support piece. This lower portion has an opening 10 (refer FIG. 3) in it which serves as a retaining aperture for a thumbscrew means 3. The thumbscrew may also be of metal and of rod type construction. The thumbscrew retaining opening should be about as large the width of the thumbscrew so that the thumbscrew can be used to secure the upper or prop piece 6. The prop piece is also preferably of metal and in a rod-like shape. A second narrow aperture 11 (not shown) near the bottom of the support piece serves as an opening through which the prop piece can be placed through and then secured by the thumbscrew. This second opening is at the lowermost part of the C shaped lower portion of the support piece. The upper piece placed within the second opening would be perpendicular to the thumbscrew means.

The upper part 13 of the C shaped lower portion ends near the middle of the support piece and on the side opposite the bent portion 2. This upper part may be of the same material as the rest of the support means means and has an aperture 12 in it. This aperture serves as a second support (in conjunction with aperture 11) for the prop piece so that the prop can be placed within these two apertures and line up perpendicular to the lower piece.

The prop piece itself is preferably of metal construction and may be a rod shape. The upper part 7 of the prop is bent at 90 degrees to the remainder of the prop and this upper part also has a slight U shaped bend in it in the preferred version. The slight bend in the upper part of the prop allows for the grill lid 9 to be better secured by the prop.

To use, the prop piece is placed in the two apertures 11 and 12 and adjusted by moving up and down until the desired height for the lid of the grill is found. When the grill lid is at the desired height, the prop is secured by the thumbscrew 3 and upper part of the support is set over the rim of the lower halve of the grill and the grill lid now rests in place.

I claim:

1. An apparatus for use with grills having lids for propping up said lids at various levels above the rim of said grill comprising: a one-piece constructed bent material forming a substantially S-shaped support piece having upper, middle and lower portions, said upper portion is of curved construction and sized to fit over said grill rim, said lower portion is of C shaped construction having upper, middle and lower portions, said lower portion of said C shape is about perpendicular to said middle portion of said support and has a first aperture, said middle portion of said C shape is about parallel to said middle portion of said support and has a second aperture for a thumbscrew and the upper portion of said C shape is about perpendicular to said middle portion of said support and has a third aperture, said C shape is on a side of said support that is opposite said upper curved portion, prop rod sized to fit said first and third apertures and having a propping means for supporting said lid of said grill, so that said prop rod may be freely moved up and down within said C shaped portion and secured into position by a thumbscrew placed in said second aperture.

2. The apparatus of claim 1 wherein said prop piece and said support piece are made of metal.

* * * * *